United States Patent

Rossato

[11] Patent Number: 5,522,139
[45] Date of Patent: Jun. 4, 1996

[54] DEVICE FOR DETERMINING THE SLACK IN ARTICULATED JOINTS AND FOR MEASURING THE STEERING ANGLES OF MOTOR VEHICLES

[76] Inventor: Eride Rossato, 30035 Via Galilei, 20, Mirano, Italy

[21] Appl. No.: 378,572

[22] Filed: Jan. 26, 1995

[51] Int. Cl.⁶ ................................................. G01B 5/24
[52] U.S. Cl. .................................. 33/203.12; 33/203.14
[58] Field of Search ................................ 33/1 PT, 203, 33/203.12, 203.13, 203.14, 203.15, 203.16, 203.17, 203.21, 286, 288, 335, 533, 534, 600, 645

[56] References Cited

U.S. PATENT DOCUMENTS

| | | | |
|---|---|---|---|
| 1,927,488 | 9/1933 | Christensen et al. | 33/203.12 |
| 3,321,983 | 2/1966 | Bender | 33/203.12 |
| 3,875,672 | 4/1975 | Castoe | 33/203.12 |
| 4,897,926 | 2/1990 | Altnether et al. | 33/203.14 |
| 4,924,591 | 5/1990 | Brodu | 33/203.14 |
| 5,090,235 | 2/1992 | Hirano et al. | 33/203.13 |

FOREIGN PATENT DOCUMENTS

| | | |
|---|---|---|
| 2571495 | 4/1986 | France . |
| 1530639 | 11/1969 | Germany . |
| 8800876 | 4/1988 | Netherlands . |

Primary Examiner—Willliam A. Cuchlinski, Jr.
Assistant Examiner—G. Bradley Bennett
Attorney, Agent, or Firm—Hoffman, Wasson & Gitler

[57] ABSTRACT

A device for determining the slack in articulated joints and measuring the steering angles of motor vehicles is provided. The device can be easily and quickly converted to measure the slack or measure the steering angles, and is housed in the traditional recess of the runway of the vehicle lift.

15 Claims, 3 Drawing Sheets

DEVICE FOR DETERMINING THE SLACK IN ARTICULATED JOINTS AND FOR MEASURING THE STEERING ANGLES OF MOTOR VEHICLES

FIELD OF THE INVENTION

This invention relates to a device for determining the slack in articulated joints and for measuring the steering angles of motor vehicles.

BACKGROUND OF THE INVENTION

In motor vehicle service stations devices are provided for measuring the slack in the vehicle articulated joints. These devices comprise a lower plate and an upper plate movable horizontally relative to the lower plate in the two perpendicular directions. These devices are generally installed in pairs on a vehicle lift, the lower plate being fixed to the corresponding runway and the upper plate supporting a wheel of the vehicle which is to be checked and which has previously been driven onto the lift. To determine the presence of any slack in the articulated joints of the steering system and to measure its extent, the upper plate is made to move relative to the fixed lower plate while observing the behavior of the vehicle during these movements, viewing from below with the aid of an electric lamp.

A drawback of this known device is that it has a rather large height (about 7 cm), and as it is generally installed permanently on the vehicle lift that can in practice be used only for this purpose.

Circular ball plates are also known for measuring the suspension geometry and the wheel steering angles. They are also generally mounted on the vehicle lift runways in suitable recesses provided within them, so restricting their use to this one purpose because of their particular configuration and the nature of the functions performed.

Hence those vehicle service stations equipped both for determining slack and for measuring steering angles must necessarily be provided with two vehicle lifts or in any event two separate stations, one equipped with the accessories of one type and the other equipped with the accessories of the other type, with obvious cost and space considerations.

Alternatively, the accessories for the two different measurements could be mounted interchangeably on one and the same vehicle lift, but this would require a series of operations for installing the appropriate accessories before effecting a given type of measurement and their removal after making this measurement.

DESCRIPTION OF THE PRIOR ART

FR-A-2571495 discloses a device combining a slack determination assembly, comprising an intermediate plate which is movable under the action of actuators in two lateral orthogonal (x,y) directions with respect to a base or frame, with a steering angle measurement arrangement of a rotatable plate with rotation axis laterally movable (in x,y directions) within guides with respect to intermediate plate. The plate which is borne by ball bearing on plate may be centred by actuation of cables and may be locked with respect to the plate by means of vertical actuators.

U.S. Pat. No. 4,897,926 discloses a vehicle wheel turning angle gauge having a base to support a wheel engaging turnable plate which supports an optical encoder device mounted in non-rotary position so an operating shaft can engage and turn with the turnable plate to generate signals of the degree of turn and the direction of that turn.

NL-A-8.800.876 describes a support for a turnable platen.

SUMMARY OF THE INVENTION

An object of the invention is to provide a device which can be used both for determining the slack in articulated joints and for measuring the steering angles of motor vehicle wheels and which can be converted from one to the other form for the appropriate use.

A further object of the invention is to provide a device which may be housed in the traditional recess of the runway of a vehicle lift.

A further object of the invention is to provide a device in which this conversion can be effected with the maximum speed and ease by the operator.

A further object of the invention is to provide a device which can be mounted on conventional vehicle lifts without thereby restricting them to this specific use.

A further object of the invention is to provide a device which combines multi-purpose with compact construction, safe and reliable operation and minimum space requirement such as to enable it to be accommodated within the recess generally provided in the runways of vehicle lifts.

A further object of the invention is to provide a device which enables the upper plate to be subjected to 90° or 45° movements, on the basis of the particular measurements to be made.

These and further objects which will be apparent from the description given hereinafter are attained according to the invention through a device for determining the slack in articulated joints and for measuring the steering angles of motor vehicles to be positioned in a recess provided in each runway of a vehicle lift, comprising a base plate to rest on the bottom of said recess, an upper plate horizontally slidable with respect to said base plate, pairs of actuators associated to said upper plate to cause its slidable movements, a ball platen resting on said upper slidable plate, and means for centering said ball platen with respect to said upper plate and for locking them together, characterised in that it comprises:

- a pair of first actuators arranged parallel to each other and fixed to said base plate,
- an intermediate plate fixed to the rods of said first actuators and having two parallel edges slidable within guides laterally formed in the bodies of the actuators,
- a pair of second actuators arranged perpendicular to the first actuators and fixed to said intermediate plate, the rods of said second actuators being fixed to said upper plate,
- a pair of guides laterally formed in the bodies of said second actuators for two parallel opposing edges of said upper plate,
- means for maintaining the position of said ball platen elastically centered with respect to said upper plate.

BRIEF DESCRIPTION OF THE DRAWINGS

The present invention is further clarified with reference to the enclosed sheets of drawings in which.

DESCRIPTION OF PREFERRED EMBODIMENTS

Figure 1:
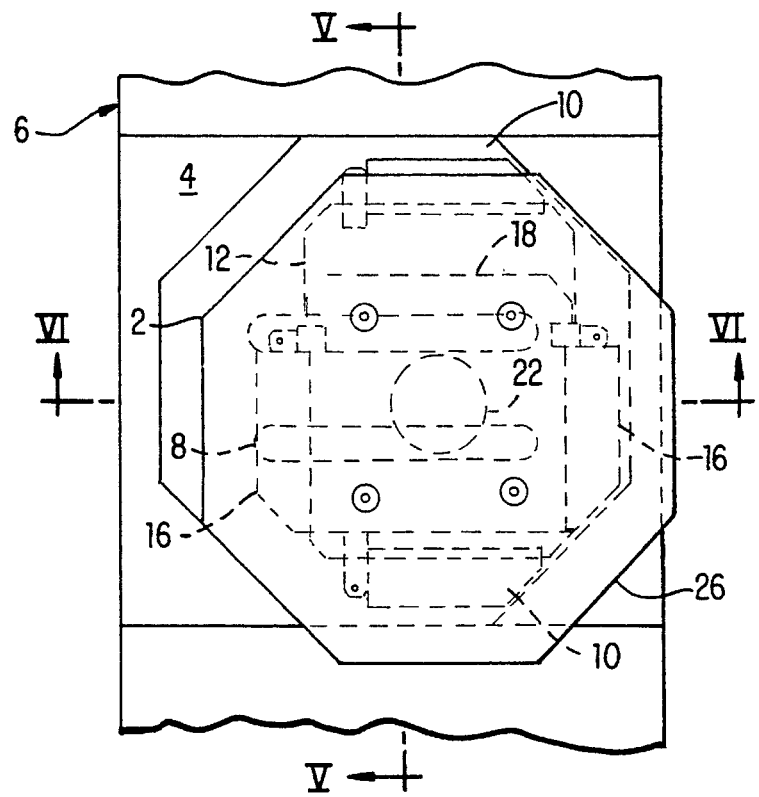
FIG. 1 is a plan view of a device according to the invention fitted into the recess in the runway of a vehicle lift.
Figure 2:
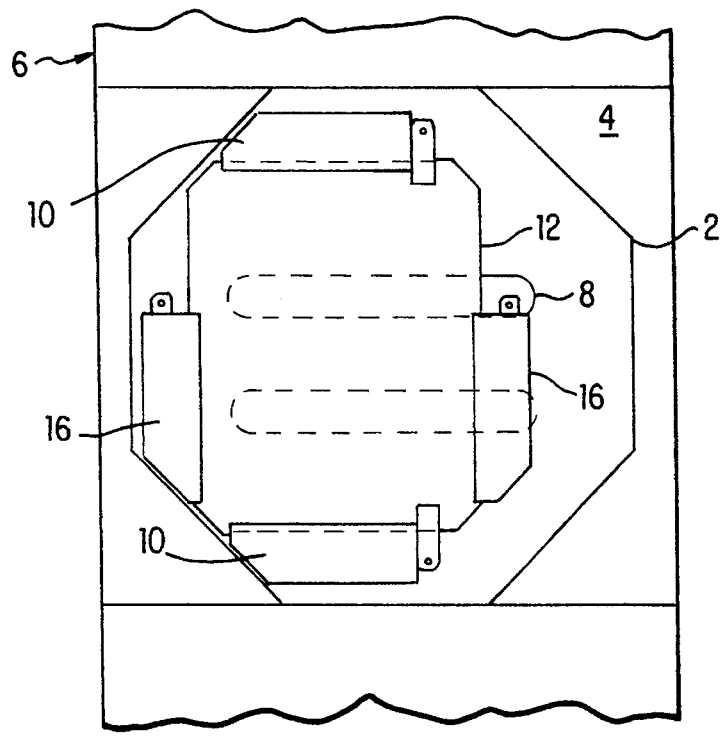
FIG. 2 is a plan view thereof without the upper plate or the overlying platen.
Figure 3:
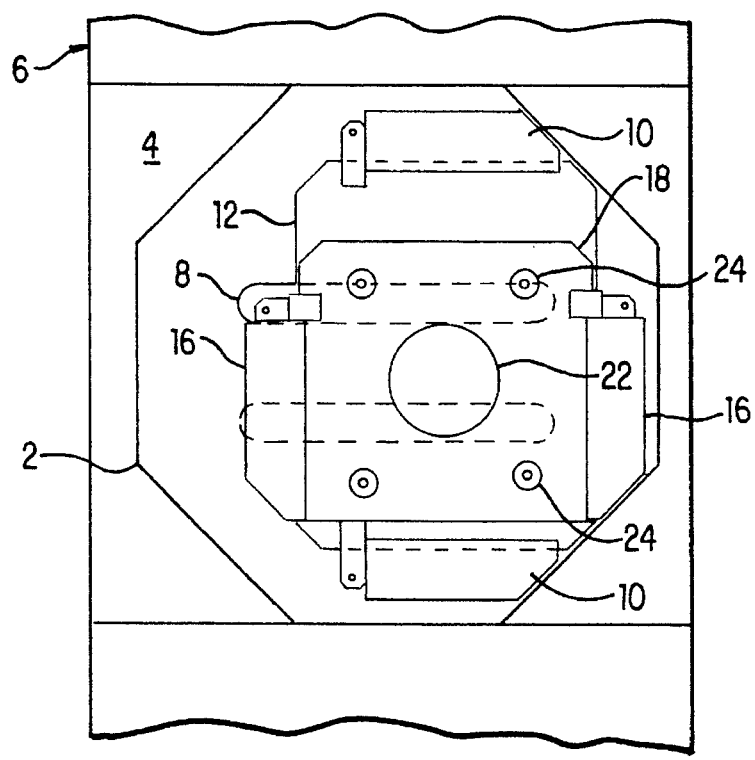
FIG. 3 is a plan view thereof without the platen.
Figure 4:
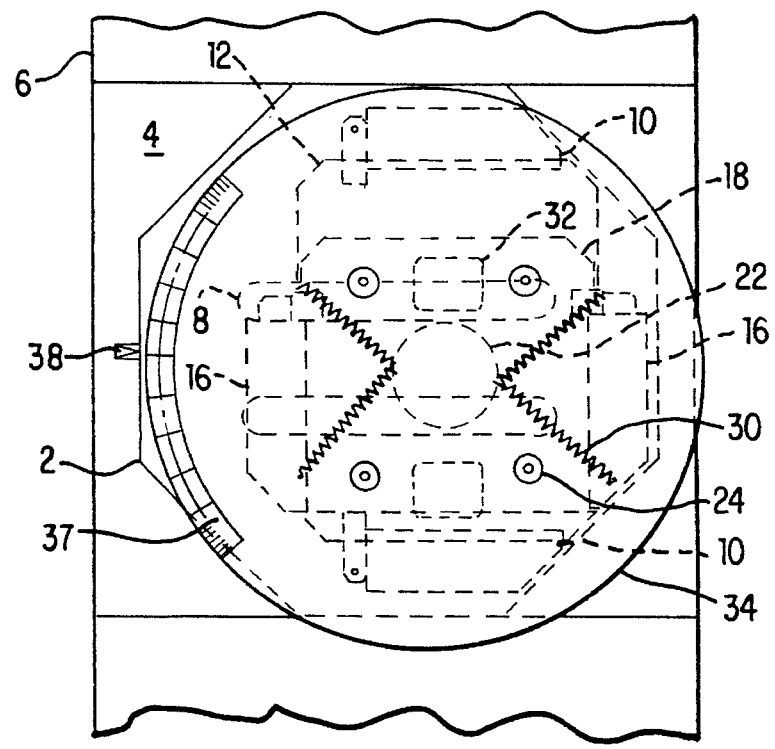
FIG. 4 shows the device in the same view as FIG. 1 but with a circular instead of octagonal platen.
Figure 5:
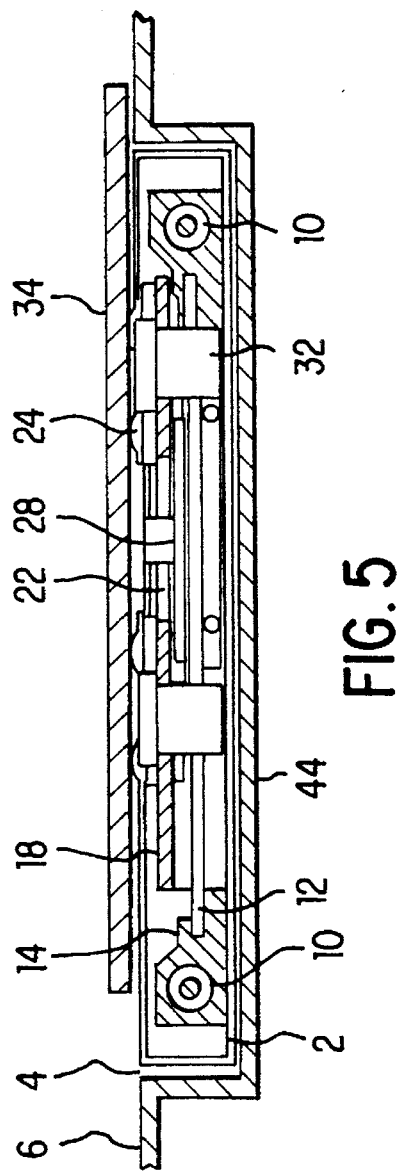
FIG. 5 is an enlarged longitudinal section therethrough on the line V—V of FIG. 1.
Figure 6:
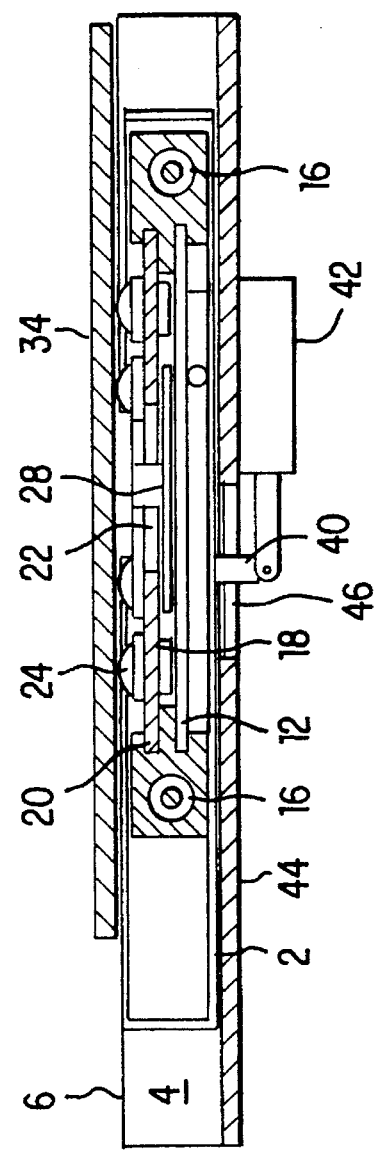
FIG. 6 is an enlarged cross-section therethrough on the line VI—VI of FIG. 1.

As can be seen from FIG. 1 the device according to the invention comprises a base plate 2 in the form of a regular octagon of dimensions suitable to allow it to be accommodated within the recess 4 provided in each runway 6 of a vehicle lift. The base plate 2 comprises two rectilinear slots 8, the purpose of which will be apparent hereinafter.

Two actuators 10 in the form of two hydraulic cylinders are applied to the base plate 2 in proximity to those opposing sides thereof parallel to the two slots 8, and have their rods connected to a substantially rectangular intermediate plate 12 of smaller surface area than the base plate 2. It is movable horizontally relative to said base plate 2 under the control of the two cylinders 10. For this purpose the mutually facing lateral surfaces of these are provided with guides 14 engaging two opposite edges of the plate 12 in order to guide it in its translational movements, which are therefore parallel to the axis of the cylinders 10.

A further two actuators 16 in the form of hydraulic cylinders are fixed to the plate 12 on the two sides not engaged in the guides 14, and have their rods connected to a third rectangular plate 18, which in this manner can slide horizontally in a direction perpendicular to the direction in which the underlying intermediate plate 12 slides and is guided in its movements by the engagement of two of its lateral edges in corresponding guides 20 formed in the body of the cylinders 16.

This upper third plate 18, which is smaller than the underlying intermediate plate 12 and comprises a central circular hole 22, is provided on its upper surface with a plurality of ball supports 24, on which there rests an octagonal platen substantially analogous to the base plate 2 and forming the support platen for a wheel of the motor vehicle.

From the center of the lower surface of the octagonal platen 26 there projects downwards a mushroom-shaped appendix 28, the head of which has a diameter greater than the diameter of the hole 22 to allow said platen 26 to undergo substantial movements relative to the underlying rectangular plate 18, while preventing its complete separation. In addition, between the mushroom-shaped appendix 28 of the octagonal platen 26 and the underlying rectangular plate 18 there are interposed two pairs of spiral springs 30, the purpose of which is to maintain the two plates 26 and 18 mutually centered elastically in the absence of external forces.

Within the rectangular plate 18 there are also provided two small cylinders 32 with their axis perpendicular to this plate and with their rod emerging upperly and engaging in a corresponding hole provided in the overlying platen 26 and facing said rod when said platen 26 is centered with respect to the plate 18.

The device of the invention also comprises a circular platen 34, which can replace the octagonal platen 26. This circular platen 34 is also provided with a lower mushroom-shaped appendix 28 and holes 36 to be engaged by the locking cylinders 32, and is also provided with a graduated edge 37, with which there is associated a pointer 38 rigid with the base plate 2.

The device of the invention further comprises a plurality of sensors and connectors, which enable the device to be connected to a small control centre preferably applied below the runway 6 in which the device is installed, and also enable the operating cycle described hereinafter to be correctly executed. As the control centre is constructionally and operationally of conventional type it is not shown on the drawings. It comprises a vessel., a pump and a plurality of solenoid valves, and miscellaneous controls and regulators depending on the types of motor vehicles concerned.

All the components are miniaturized, and because they are housed below the runway 6 they substantially limit the connections to the device of the invention. In practice only one control centre is required for the two devices mounted in the two runways of the vehicle lift; two connection pipes are therefore provided between the control centre and the device mounted in the same runway 6, plus a further two connection pipes between the control centre and the device mounted in the other runway of the vehicle lift. Finally, an electrical supply is required for the control centre.

To determine the existence of possible slack, two devices of the aforedescribed type are firstly positioned on the vehicle lift in the recesses 4 generally provided in its two runways 6. During this, care must be taken that each device is positioned such that the two cylinders 10 rigid with the base plate 2 have their axis perpendicular to the longitudinal axis of the corresponding runway. In order for the measurements to be correctly effected, the two devices must be positioned at a distance apart equal to the wheel gauge of the vehicle under measurement, hence as the runways of a vehicle lift are generally wide enough to allow the same lift to be used for vehicles with different wheel gauges, each device is made transversely movable within the corresponding recess 4 of the runway 6 either manually or mechanically. In the first case a downwardly directed appendix 40 is fixed to the octagonal base plate 2 to engage in holes provided in the base 44 of the recess 4 corresponding to the different transverse positions which the device can assume within the recess. In the second case a transverse cylinder 42 is positioned below the base 44 of the recess 4 so that its rod engages in the appendix 40 which projects lowerly from the base plate 2 and passes through a transverse slot 46 provided in said base 44. In either case there is no problem in hydraulically feeding the cylinders 10, 16 and 32 whatever the position of the base plate 2 within the recess 4, because the slots 8 provided in said plate enable the feed pipes to pass through it whatever its position.

Because of the fact that, as will be apparent hereinafter, the device of the invention must be able to be positioned within the recess 4 in two separate positions rotated through 45°, the appendix 40 should be situated exactly at the centre of the plate 2.

To determine the existence of slack in a motor vehicle, the two devices contained in the recesses 4 of the two runways 6 must firstly be set to the correct distance apart by transversely adjusting at least one device manually or mechanically.

Having completed this positioning, the vehicle is driven onto the runways of the vehicle lift and positioned such that its two front wheels lie exactly at the centre of the platens 26 of the two devices, so that these are locked relative to the underlying plates.

Then, after deactivating the two cylinders 32 and hence releasing the platen 26 from the plate 18, the two pairs of cylinders 10 and 16 are caused to undergo small longitudinal and/or transverse movements, to determine whether slack exists or not. This determination is generally effected with the aid of a lamp which upwardly illuminated the region to be checked and is provided with pushbuttons to control the cylinders 10 and 16.

If the wheels are to be subjected to small pulse movements at 45° to the longitudinal axis of the runway, each device can be positioned in its respective recess rotated through 45°. Under these conditions it is necessary to operate only one of the two pairs of cylinders 10 or 16 to obtain the pulse movements in the required direction. In this respect, in such cases the device of the invention could be formed with only one pair of cylinders 10 or 16 or with only one of the plates 12 or 18.

If it is also required to determine the wheel steering angle the octagonal platen 26 can be replaced by the circular platen 34, onto which, after being locked to the plate 18 by the cylinders 32, the corresponding steered wheel of the vehicle is driven. The plate 34 is then released and the wheel is steered and the angle or rotation of said plate 34 is read by the position of the pointer 38 on the graduated edge 37.

Basically, because of the combination of the slack determination and steering angle measurement instruments into a single unit and because of the original arrangement and coordination of the various interacting parts, the device of the invention enables the conventional method to be considerably modified and considerable advantages to be achieved, and in particular:

- slack determination and steering angle measurement on a motor vehicle can be effected at choice with a single device without having to move the vehicle from its position on the vehicle lift,
- the device is multi-purpose while being of extremely small overall size, allowing it to be contained within the conventional recesses provided in the runways of the vehicle lift,
- it can be removed from the vehicle lift, which is therefore not constrained to this specific use,
- it can be used without distinction in either the right or left runway,
- it enables the upper platen to be moved not only parallel and perpendicular to the runways but also at an angle of 45° thereto,
- it can be used for vehicles of practically any wheel gauge, and
- it is simple to install and does not require external connections other than to the electricity supply.

I claim:

1. A device for determining slack in articulated joints and for measuring steering angles of motor vehicles to be positioned in a recess provided in each runway of a vehicle lift, comprising:

a base plate disposed on a bottom of said recess;

a pair of first actuators arranged parallel to each other and fixed to said base plate, said first actuators having rods;

an intermediate plate fixed to said rods of said first actuators, and having two parallel edges slidable within guides laterally formed in bodies of said first actuators;

a pair of second actuators fixed to said intermediate plate and having a longitudinal axis orthogonal to a longitudinal axis of said first actuators, said second actuators having rods;

an upper plate fixed to said rods of said second actuators, said upper plate having two parallel edges disposed in a pair of guides laterally formed in bodies of said second actuators;

a ball platen disposed on said upper plate;

means for maintaining said ball platen elastically centered with respect to said upper plate; and means for locking said ball platen and said upper plate together.

2. A device as claimed in claim 1, wherein said base plate has a regular octagon shape, a distance between opposing sides of said base plate being substantially equal to a dimension of said recess measured along a longitudinal axis of said run.

3. A device as claimed in claim 1, wherein said first and second actuators include hydraulic cylinder-piston units.

4. A device as claimed in claim 1, further comprising means for limiting horizontal movements of said ball platen relative to said upper plate.

5. A device as claimed in claim 1, wherein said upper plate comprises a central substantially circular aperture in which there engages an appendix projecting from a lower surface of said ball platen.

6. A device as claimed in claim 5, wherein said appendix is substantially of mushroom shape, with a diameter of a head of said appendix being greater than a diameter of said aperture provided in said upper plate.

7. A device as claimed in claim 1, further comprising at least one additional actuator having a substantially vertical axis applied to said upper plate and engaging said ball platen to lock said platen to said upper plate on command.

8. A device as claimed in claim 7, wherein springs are interposed between said ball platen and said upper plate to maintain them in a mutually centered position in absence of external forces.

9. A device as claimed in claim 7, wherein said ball platen has a regular octagon shape.

10. A device as claimed in claim 7, wherein said ball platen is of circular shape.

11. A device as claimed in claim 10, wherein said ball platen is provided with a graduated edge with which there is associated a pointer rigid with said base plate.

12. A vehicle lift incorporating said device as claimed in claim 7, wherein said base plate can be moved transversely within said corresponding recess of each runway.

13. A vehicle lift as claimed in claim 12, wherein said base plate is provided with at least one downwardly directed appendix engageable within holes provided in said bottom of said recess.

14. A vehicle lift as claimed in claim 12, wherein said base plate is provided with at least one downwardly directed appendix passing through a transverse slot provided in said bottom of said recess and engaged by an actuator positioned transversely below said base.

15. A vehicle lift as claimed in claim 12, wherein said base plate comprises at least one transverse slot.

\* \* \* \* \*